United States Patent
Nihei

(10) Patent No.: US 10,209,591 B2
(45) Date of Patent: Feb. 19, 2019

(54) PROJECTION TYPE LIQUID CRYSTAL DISPLAY DEVICE

(71) Applicant: Japan Display Inc., Minato-ku (JP)

(72) Inventor: Fumiaki Nihei, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/349,009

(22) Filed: Nov. 11, 2016

(65) Prior Publication Data

US 2017/0059956 A1 Mar. 2, 2017

Related U.S. Application Data

(63) Continuation of application No. 14/257,102, filed on Apr. 21, 2014, now Pat. No. 9,529,218.

(30) Foreign Application Priority Data

Apr. 25, 2013 (JP) .................................. 2013-092088

(51) Int. Cl.
*G02F 1/1333* (2006.01)
*G02F 1/1362* (2006.01)
(Continued)

(52) U.S. Cl.
CPC ... *G02F 1/136286* (2013.01); *G02B 27/0101* (2013.01); *G02F 1/13306* (2013.01);
(Continued)

(58) Field of Classification Search
CPC .............................................. G02F 1/133308
See application file for complete search history.

(56) References Cited

U.S. PATENT DOCUMENTS

2003/0076459 A1    4/2003  Murade
2005/0117197 A1*   6/2005  Ide .................... G02F 1/1333
                                              359/291
(Continued)

FOREIGN PATENT DOCUMENTS

JP    2003-177427 A    6/2003
JP    2008-233733 A   10/2008
(Continued)

OTHER PUBLICATIONS

Korean Office Action dated Mar. 19, 2015 in Patent Application No. 10-2014-0048017 (with English Translation).
(Continued)

*Primary Examiner* — Edmond Lau
(74) *Attorney, Agent, or Firm* — Oblon, McClelland, Maier & Neustadt, L.L.P.

(57) ABSTRACT

According to one embodiment, a projection type liquid crystal display device includes a liquid crystal display panel and a bezel. The liquid crystal display panel includes an array substrate, an opposed substrate, and a liquid crystal layer provided between the array substrate and the opposed substrate. The liquid crystal display panel has a first surface on one side of the array substrate and the opposed substrate, and a second surface on another side of the array substrate and the opposed substrate. The bezel covers a part of the liquid crystal panel. The bezel includes a first opening provided on a side of the first surface and a second opening provided on a side of the second surface. The second opening has a larger size than the first opening.

9 Claims, 3 Drawing Sheets

(51) Int. Cl.
    *G02F 1/1335* (2006.01)
    *G02B 27/01* (2006.01)
    *G02F 1/133* (2006.01)
    *G02F 1/1343* (2006.01)
    *G02F 1/1345* (2006.01)

(52) U.S. Cl.
    CPC .... *G02F 1/13452* (2013.01); *G02F 1/133308* (2013.01); *G02F 1/133512* (2013.01); *G02F 1/134336* (2013.01); *G02F 2001/133328* (2013.01); *G02F 2001/136281* (2013.01); *G02F 2201/123* (2013.01)

(56) References Cited

U.S. PATENT DOCUMENTS

| | | |
|---|---|---|
| 2006/0152665 A1 | 7/2006 | Murade |
| 2007/0206147 A1 | 9/2007 | Murade |
| 2008/0198314 A1 | 8/2008 | Murade |
| 2009/0059174 A1* | 3/2009 | Shirasaka ............ H04N 9/3167 353/20 |
| 2009/0213292 A1 | 8/2009 | Park et al. |
| 2010/0033975 A1 | 2/2010 | Beck et al. |
| 2012/0229736 A1* | 9/2012 | Osaki ................ G02F 1/133512 349/96 |

FOREIGN PATENT DOCUMENTS

| | | |
|---|---|---|
| JP | 2009-069569 | 4/2009 |
| JP | 2010-524197 A | 7/2010 |
| KR | 2003-0029037 A | 4/2003 |
| KR | 10-2009-0090547 A | 8/2009 |
| KR | 10-2010-0016527 A | 2/2010 |
| TW | 200401241 A | 1/2004 |

OTHER PUBLICATIONS

Office Action dated Sep. 25, 2015 in Korean Patent Application No. 10-2014-0048017 (with English language translation).
Combined Taiwanese Office Action and Search Report dated Oct. 1, 2015 in Patent Application No. 103115070 (with English language translation).

* cited by examiner

PROJECTION TYPE LIQUID CRYSTAL DISPLAY DEVICE

CROSS-REFERENCE TO RELATED APPLICATIONS

The present continuation application claims the benefit of priority under 35 U.S.C. § 120 to application Ser. No. 14/257,102, filed on Apr. 21, 2014, and claims the benefit of priority under 35 U.S.C. § 119 from Japanese Patent Application No. 2013-092088, filed on Apr. 25, 2013; the entire contents of both of which are incorporated herein by reference.

FIELD

This invention relates to a projection type liquid crystal display device such as a vehicle-mounted head up display (HUD) and a projector with improved light resistance.

BACKGROUND

Currently, liquid crystal display devices are widely used in color televisions, personal computers, video display monitors, and mobile phones in view of low profile, light weight, and low power consumption. The types of display in such liquid crystal display devices include the direct view type and the projection type. In the direct view type, the image displayed on a liquid crystal display panel is directly viewed. In the projection type, the image displayed on a liquid crystal display panel is projected for display on a screen, car windshield and the like.

In the projection type liquid crystal display device, light stronger than that in the direct view type liquid crystal display device needs to be projected toward a liquid crystal display panel from its back surface in order to project an image. Thus, in order to prevent malfunctions due to light leakage of pixel driving switching transistors (TFT) placed in the display region, a light shielding layer is provided on the lower surface of the semiconductor layer of the TFT. If necessary, the front surface (upper surface) of the TFT is also light shielded against external light.

Furthermore, high definition pixels are needed to magnify the image displayed in a small display region of the liquid crystal display device. Thus, the liquid crystal display panel is often manufactured by the p-Si process. By adopting this p-Si process, a driving circuit for driving pixels such as a scanning line driving circuit can also be incorporated in the liquid crystal display panel by the same process. Thus, the configuration of a liquid crystal display device integrated with a driving circuit is in widespread use.

Patent Literature 1 (Japanese Unexamined Patent Application Publication 2009-69569) discloses a liquid crystal display device in which the aforementioned type of liquid crystal display device integrated with a driving circuit is provided with a light shielding film to shield light.

DETAILED DESCRIPTION

According to one embodiment, a projection type liquid crystal display device includes a liquid crystal display panel and a bezel. The liquid crystal display panel includes an array substrate, an opposed substrate, and a liquid crystal layer provided between the array substrate and the opposed substrate. The liquid crystal display panel has a first surface on one side of the array substrate and the opposed substrate, and a second surface on another side of the array substrate and the opposed substrate. The bezel covers a part of the liquid crystal panel. The bezel includes a first opening provided on a side of the first surface and a second opening provided on a side of the second surface. The second opening has a larger size than the first opening.

The projection type liquid crystal display device according to embodiments will now be described in detail with reference to the drawings.

A configuration example of the projection type liquid crystal display device according to an embodiment is described below. The projection type liquid crystal display device includes a bezel for holding a liquid crystal display panel. The bezel is configured as an integration of separate pieces on the incident surface side and the emission surface side. Light from a light source of the liquid crystal display panel is incident on the incident surface side. The light transmitted through the liquid crystal display panel is emitted from the emission surface side.

Figure 1:
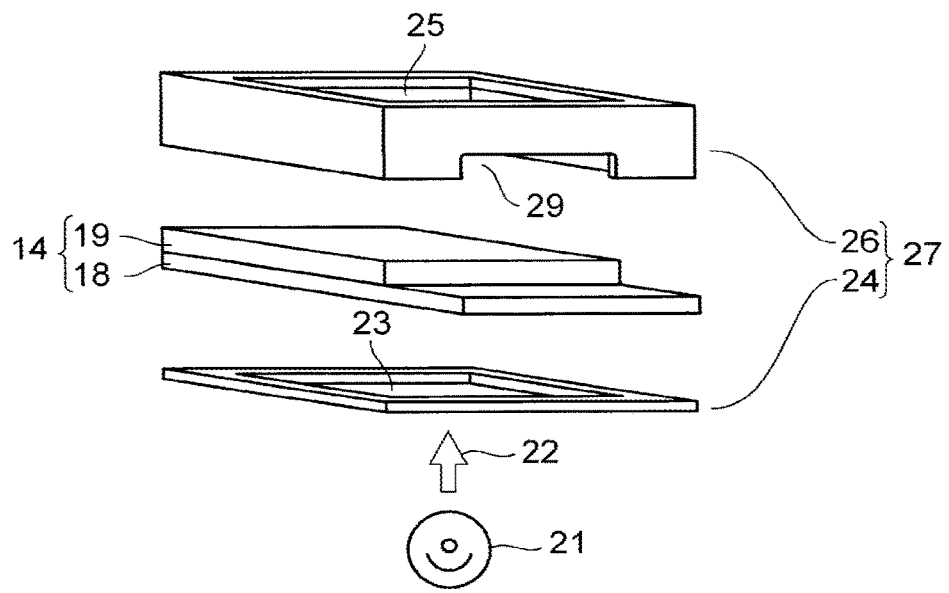
FIG. 1 is a decomposed perspective view showing a projection type liquid crystal display device of an embodiment.
Figure 2:
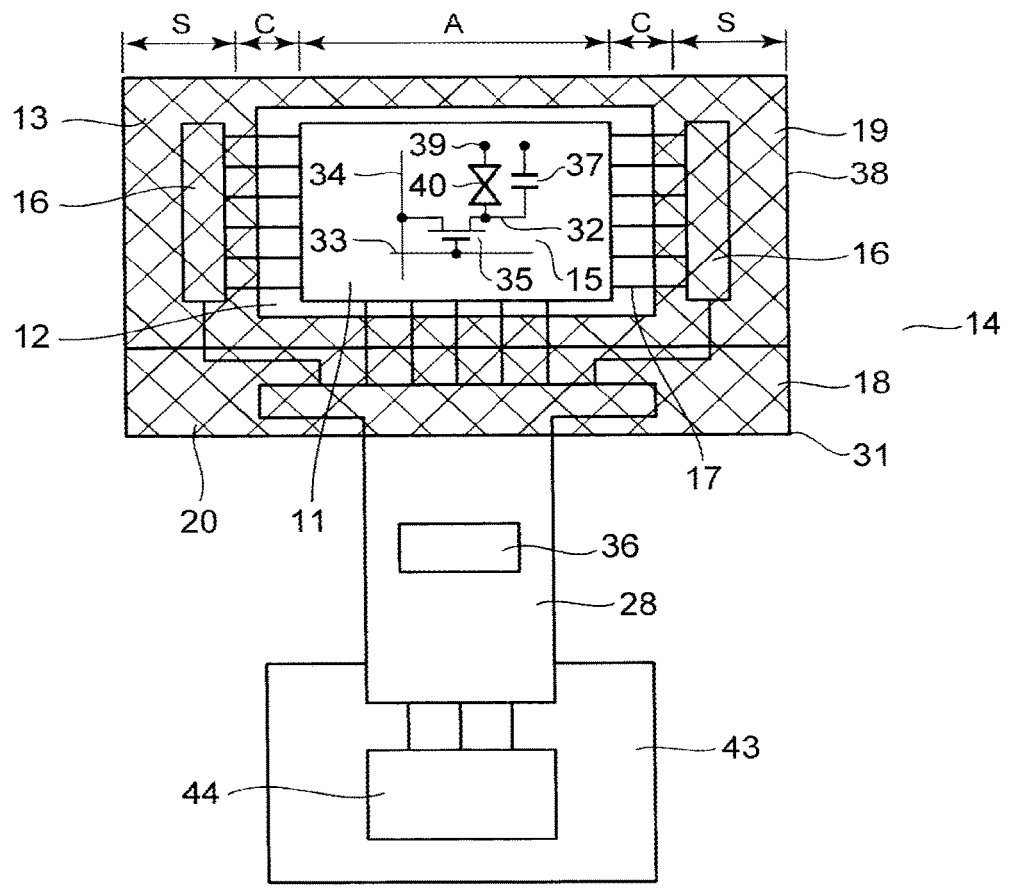
FIG. 2 is an explanation drawing showing a liquid crystal display panel forming the projection type liquid crystal display device of the embodiment.

As shown in FIG. 1 and FIG. 2, this projection type liquid crystal display device includes a liquid crystal display panel 14 including a display region 11, a peripheral region 12 placed contiguously outside the display region 11, and a frame region 13 placed contiguously further outside the peripheral region 12.

This liquid crystal display panel 14 includes an array substrate 18. Pixels 15 are arranged in the display region 11 of the array substrate 18. A driving circuit for driving the pixels 15 such as a scanning line driving circuit 16 is incorporated in the frame region 13 of the array substrate 18. Furthermore, a connection wiring pattern 17 for electrically connecting the scanning line driving circuit 16 with the pixels 15 is provided in the peripheral region 12 of the array substrate 18. This peripheral region 12 does not include semiconductor elements (active elements) and the like such as TFT susceptible to light, but includes only the connection wiring pattern 17.

Furthermore, the liquid crystal display panel 14 includes an opposed substrate 19 opposed to this array substrate 18 and defined in a smaller area than the array substrate 18. The portion of the array substrate 18 protruding outside this opposed substrate 19 is used as an external connection region 20 for connection to an external circuit.

A light source 21 is placed outside the polarizing plate (not shown) on the array substrate 18 side of this liquid crystal display panel 14. This light source 21 is made of a high-brightness light source such as a mercury lamp, fluorescent tube, and LED. The incident light 22 emitted from the light source 21 toward the liquid crystal display panel 14 is controlled by the liquid crystal display panel 14, passed through a projection lens (not shown) as necessary, and then projected on a car windshield or the like.

This liquid crystal display panel 14 is held by a bezel 27 formed from a metal material superior in thermal conductivity such as aluminum and stainless steel, a thermally conductive resin and the like. More specifically, the liquid crystal display panel 14 is sandwiched by the bezel 27 composed of an incident surface side (lower) bezel member 24 and an emission surface side (upper) bezel member 26. The incident surface side bezel member 24 includes an opening 23 (first opening) on the incident surface side of the liquid crystal display panel 14 to be irradiated with incident light 22 from the light source 21. The emission surface side bezel member 26 includes an opening 25 (second opening) on the emission surface side opposed to this incident surface side bezel member 24 across the liquid crystal display panel 14. The incident surface is e.g. a first surface. The emission surface is e.g. a second surface.

This emission surface side bezel member 26 is shaped like e.g. a box. The opening 25 on the emission surface side is formed at the bottom surface thereof. The liquid crystal display panel 14 is housed in the emission surface side bezel member 26. The emission surface side bezel member 26 is configured so that the open portion of the box-like emission surface side bezel member 26 is capped with the flat plate-like incident surface side bezel member 24.

The incident surface side bezel member 24 and the emission surface side bezel member 26 are integrally fixed to each other. This fixing can be achieved by fixing means as a combination of a recess and a hook. Alternatively, a plurality of protruding pieces can be formed on the opening end side of the emission surface side bezel member 26 in the extending direction thereof, and bent inward from outside the incident surface side bezel member 24. The integration can be achieved by fixing means such as swaging, screwing, and soldering. Alternatively, the incident surface side bezel member 24 and the emission surface side bezel member 26 can be integrally formed by bending a single flat metal plate, and the opening ends can be fitted together, or fixed by the aforementioned fixing means. Any configuration can be adopted as long as the liquid crystal display panel 14 is ultimately housed and fixed in the bezel 27 composed of the incident surface side bezel member 24 and the emission surface side bezel member 26.

A notch 29 for passing a flexible printed circuit board (FPC) 28 for external connection is provided at the position of the emission surface side bezel member 26 corresponding to the external connection region 20 of the liquid crystal display panel 14. This notch 29 is formed to pass the FPC 28. Thus, for instance, in the case where the external connection region 20 of the liquid crystal display panel 14 is placed on the scanning line driving circuit 16 side, this FPC 28 is disposed on the short length side of the liquid crystal display panel 14. In this case, it is to be easily understood that the notch 29 is also formed on the short length side accordingly.

In the array substrate 18 of this liquid crystal display panel 14, transparent pixel electrodes 32 made of indium tin oxide (ITO) or the like and constituting the pixels 15 are arranged in a matrix on the major surface of a transparent insulating substrate 31 made of glass material or heat resistant synthetic resin. A plurality of scanning lines 33 are disposed in the row direction of these pixel electrodes 32. A plurality of signal lines 34 are disposed in the column direction of the pixel electrodes 32.

The array substrate 18 includes a plurality of TFT 35 as switching elements. Each TFT 35 is provided near the crossing position of the scanning line 33 and the signal line 34 corresponding to the pixel electrode 32. The TFT 35 is operated as follows. The gate electrode of the TFT 35 is connected to the scanning line 33 formed along the row of the pixel electrodes 32. The source electrode or drain electrode of the TFT 35 is connected to the signal line 34 formed along the column of the pixel electrodes 32. The TFT 35 is made electrically continuous by a driving voltage supplied from the scanning line driving circuit 16 through the scanning line 33. A signal voltage from a signal line driving circuit 36 placed in the FPC 28 is applied to the pixel electrode 32 through the source/drain path of the TFT 35. This FPC 28 is connected to a control circuit 44 installed on a printed wiring substrate 43. This control circuit 44 supplies and controls clock signals, image data, synchronization signals and the like for the scanning line driving circuit 16 and the signal line driving circuit 36.

The pixel electrode 32 is connected in parallel with an auxiliary capacitance 37 made of an auxiliary capacitance line set to a prescribed potential. An orientation film (not shown) made of polyimide or the like is further provided on the upper surface of the TFT 35, the pixel electrodes 32, the scanning lines 33, the signal lines 34 and the like. The array substrate 18 is thus configured.

The opposed substrate 19 opposed to this array substrate 18 includes a transparent insulating substrate 38 also formed from glass material or heat resistant synthetic resin. Transparent common electrodes 39 made of ITO or the like are provided on the major surface of this transparent insulating substrate 38 opposed to the array substrate 18. A black matrix (black light shielding film) 53 (see FIG. 4) for shielding light leakage through the gap between the wirings is provided corresponding to the scanning line driving circuit 16 in the peripheral portion of the array substrate 18. An orientation film (not shown) made of polyimide or the like is further provided on the upper surface of the common electrodes 39. The opposed substrate 19 is thus configured. These common electrodes 39 are supplied with a driving voltage from a common electrode driving circuit (not shown).

The array substrate 18 and the opposed substrate 19 are opposed to each other with a prescribed spacing and laminated together via a sealing material (not shown). The gap is sealed with a liquid crystal member (liquid crystal layer) 40. The thickness of this liquid crystal member 40 is defined by a spacer (not shown) interposed between the array substrate 18 and the opposed substrate 19. The liquid crystal display panel 14 is thus configured. Polarizing plates (not shown) are attached to both outer surfaces of this liquid crystal display panel 14 with an adhesive.

Here, the relationship between the liquid crystal display panel 14 and each opening 23, 25 of the bezel 27 is described. The regions of the liquid crystal display panel 14 are denoted as follows for convenience. As shown in FIG. 2, the display region 11 is denoted as display region A, the peripheral region 12 is denoted as peripheral region C, and the frame region 13 is denoted as frame region S. Thus, the regions are separately considered.

Figure 3A:
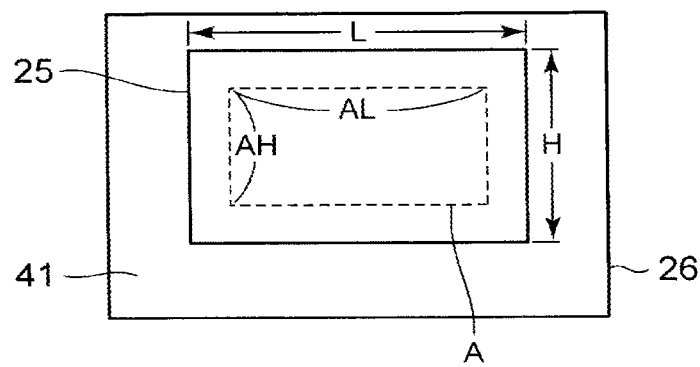
FIG. 3A and FIG. 3B are plan views showing the configuration of a bezel forming the projection type liquid crystal display device of the embodiment.

As shown in FIG. 3A, the emission surface side bezel member 26 of this bezel 27 is formed so that the size of the opening 25 covers the size of the display region A and partly covers the peripheral region C to the intermediate position thereof. More specifically, the length in the scanning line extending direction (long length direction) of the display region A is denoted as AL. The length in the signal line extending direction (short length direction) of the display region A is denoted as AH. Then, an opening 25 having a length L and a length H is formed. The length L is longer than the length AL in the long length direction. The length H is longer than the length AH in the short length direction.

However, this length L is located in the intermediate portion of the peripheral region C, and configured so as to be a length not reaching the frame region S. This means that the frame region S including the scanning line driving circuit 16 incorporated in the liquid crystal display panel 14 is covered with an eaves part 41 of the emission surface side bezel member 26. This length L is set in the relation of L≤A+C. The length H is set in a similar relation. However, in the case of this example, the signal line driving circuit 36 is not incorporated. Thus, it is sufficient to consider only the relation of the peripheral region C. Alternatively, it is also possible to place only the peripheral region C on the long length side. It is to be understood that in the case where the signal line driving circuit 36 or part of the signal line driving circuit 36 (e.g., TFT for multiple choice switching) is placed on the long length side, the peripheral region C and the frame region S need to be provided similarly.

Figure 3B:
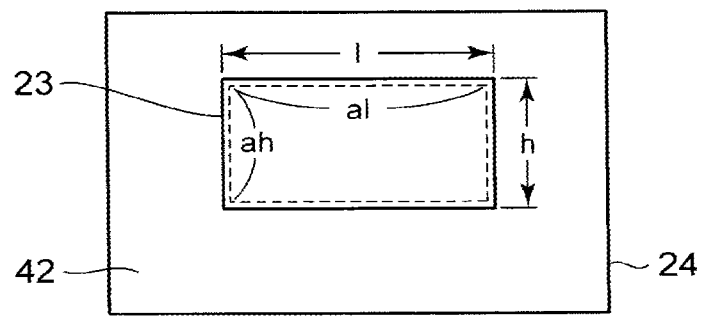

On the other hand, as shown in FIG. 3B, the incident surface side bezel member 24 is formed so that the size of the opening 23 is generally equal to the size of the display region A. More specifically, the length in the scanning line extending direction (long length direction) of the display region A as viewed from the back surface side is denoted as al. The length in the signal line extending direction (short length direction) is denoted as ah. Then, the opening 23 is formed with a length l in the long length direction and a length h in the short length direction. The length l is equal to or slightly longer than the length al in the long length direction. The length h is equal to or slightly longer than the length ah in the short length direction. Thus, the incident surface side bezel member 24 is configured so that the opening 23 is placed to expose the portion of the display region A and that the other portion is covered with an eaves part 42.

Thus, the size of the opening 23 and the opening 25 is set in the relation of opening 25>opening 23, and the opening 25 is configured to satisfy the relation of L≤A+C, although these openings 23 and 25 are both in the same bezel 27.

Figure 4:
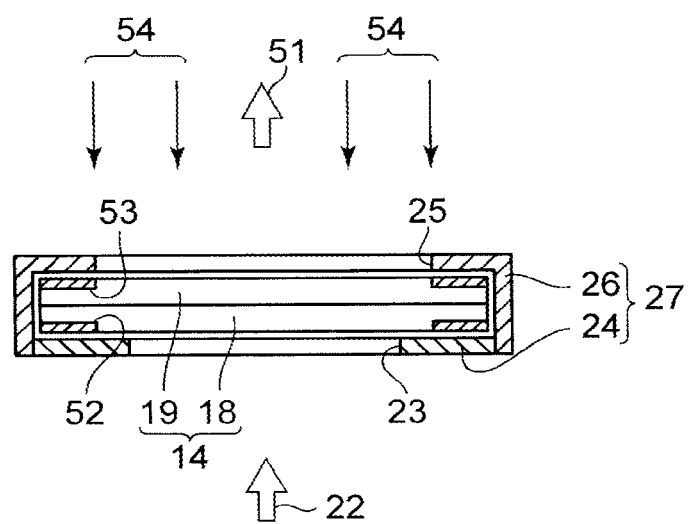
FIG. 4 is a cross-sectional view showing the configuration of the projection type liquid crystal display device of the embodiment.

Accordingly, the opening 23 of the incident surface side bezel member 24 generally corresponds to the display region 11 (region A). Thus, as shown in FIG. 4, the incident light 22 from the light source 21 passes through the display region 11, and the other regions 12, 13 (regions C, S) are light shielded by the eaves part 42.

In contrast, on the emission surface side of the liquid crystal display panel 14, the opening 25 of the emission surface side bezel member 26 is formed to be larger than the display region 11 (region A). Thus, the incident light 22 having passed through the display region 11 is projected as emission light 51. Here, a light shielding layer 52 made of metal or the like may be separately formed in the frame region 13 of the array substrate 18 of the liquid crystal display panel 14. This reliably prevents the scanning line driving circuit 16 and the like placed in the frame region 13 from malfunctions due to the incident light 22. This light shielding layer 52 can be configured to cover the entire surface of the frame region 13. Alternatively, a light shielding layer 52 corresponding to the TFT constituting the scanning line driving circuit 16 can be previously incorporated in the phase of manufacturing the array substrate 18.

It is presumed that external light may reach the liquid crystal display panel 14 from the emission surface side. Thus, a light shielding layer 53 made of a black matrix, black paint, black tape or the like can be separately provided to shield light in the frame region 13 of the opposed substrate 19 of the liquid crystal display panel 14. This reliably prevents malfunctions due to external light on the scanning line driving circuit 16 and the like. The light shielding layer 53 and the light shielding layer 52 used in combination can further suppress the occurrence of malfunctions than used singly.

Figure 5:
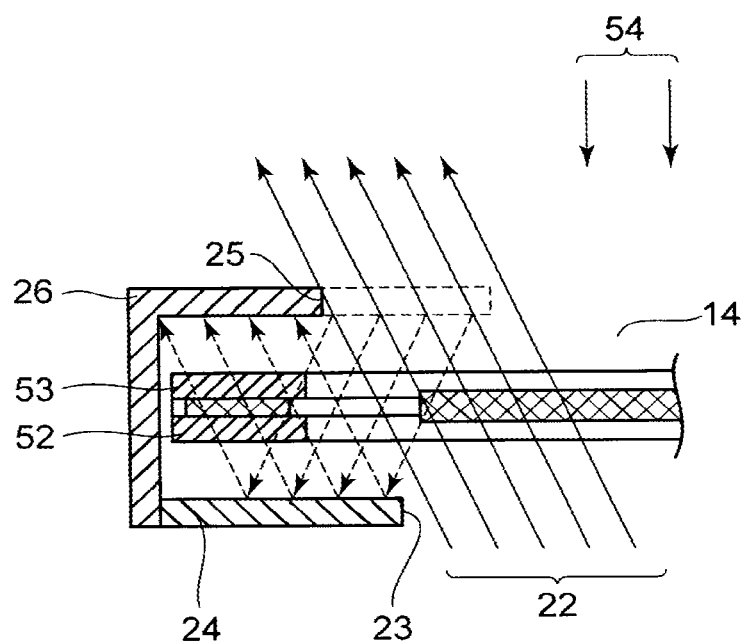
FIG. 5 is an explanation drawing for describing the operation of the projection type liquid crystal display device of the embodiment.

The relation of each opening 23, 25 of the bezel 27 is thus set in the relation shown in FIGS. 3A and 3B. This can achieve the following effects. Consider the case where the size of the emission surface side opening 25 is set comparable to or smaller than the size of the incident surface side opening 23 as shown in FIG. 5. That is, the eaves part 41 of the emission surface side bezel member 26 is formed to be larger than the eaves part 42 of the incident surface side bezel member 24 as indicated by the dashed line in the figure. In this case, the incident light 22 from the light source 21 may obliquely pass through the liquid crystal display panel 14. Then, the light obliquely reaches the back surface of the eaves part 41 indicated by the dashed line. Unfortunately, this may significantly increase the possibility that this light having obliquely reached the eaves part 41 repeats reflection and is incident on the scanning line driving circuit 16 of the liquid crystal display panel 14 as indicated by the dashed line in the figure.

Thus, as described above, the size of the emission surface side opening 25 is set larger than the size of the incident surface side opening 23 as indicated by the solid line in the figure. Accordingly, the eaves part 42 of the incident surface side bezel member 24 serves as a bank and substantially prevents the light from reaching the back surface of the eaves part 41 of the emission surface side bezel member 26. Thus, reflections by the back surface of the emission surface side bezel member 26 scarcely occur. This can suppress adverse effects on the scanning line driving circuit 16 and the like due to the reflected light.

On the other hand, external light 54 with a wide wavelength spectrum may come from the emission surface side of the liquid crystal display panel 14. In this case, there is no problem in the display region 11 (region A) because light shielding by the black matrix 53 prevents the light from reaching the TFT 35. This external light 54 reaches the peripheral region 12 (region C) adjacent to the display region 11 through the opening 25 of the emission surface side bezel member 26. However, this peripheral region 12 (region C) includes only the connection wiring pattern 17. Thus, even if the external light 54 reaches the peripheral region 12 (region C), there is no influence on the circuit operation.

Thus, the embodiment can suppress reflections of the incident light 22 from the light source 21 by the inner wall surface of the bezel 27 as much as possible. Furthermore, the embodiment can also reliably suppress malfunctions due to external light. Thus, the embodiment can improve light resistance of the scanning line driving circuit 16 and the like using a simple configuration without increasing the films constituting the array, while also minimizing the influence on the process.

The above embodiment is described with reference to the configuration in which the driving circuit is a scanning line driving circuit 16 placed on both sides of the display region 11 (region A). However, the embodiment is also similarly applicable to the configuration in which the scanning line driving circuit 16 is placed only on one side.

The bezel 27 is described in the configuration in which the light source surface side bezel member 24 and the emission surface side bezel member 26 are combined into the bezel 27. However, any other combination or any integrally formed bezel 27 can be used as long as the liquid crystal display panel 14 is held by the bezel 27. Furthermore, the expression "bezel 27" can be replaced by other expressions such as "cover member" and "holding member". It is to be easily understood that such difference in expression is encompassed within the scope of the invention.

The array substrate 18 and the opposed substrate 19 can be based on configurations other than the configuration described above. Besides, any addition and modification can be appropriately made without departing from the spirit of the invention.

The embodiments can provide a projection type liquid crystal display device capable of shielding light on the driving circuit placed therearound using a simple configuration.

Moreover, all projection type liquid crystal display devices practicable by an appropriate design modification by one skilled in the art based on the projection type liquid crystal display devices described above as embodiments of the invention also are within the scope of the invention to the extent that the spirit of the invention is included.

What is claimed is:

1. A projection type liquid crystal display device comprising:
    a liquid crystal display panel provided between a first member and a second member,
    the liquid crystal display panel including:
    an array substrate having an electrode configured as a pixel;
    an opposed substrate having a first light shield layer provided in an end of the opposed substrate; and
    a liquid crystal layer provided between the array substrate and the opposed substrate,
    wherein the pixel is arranged in a display region,
    wherein the first member is provided on an emission surface side of light from a light source, and the second member is provided on an incident surface side of the light from the light source,
    wherein the first member and the second member each have an opening corresponding to the display region,
    wherein the opposed substrate is provided on the emission surface side, and
    wherein an end of the display region side of the first member and an end of the display region side of the second member are closer to the display region than an end of the display region side of the first light shield layer.

2. The device according to claim 1,
    wherein an end of the other side of the first light shield layer is provided in same position as an end of the opposed substrate.

3. The device according to claim 1,
    wherein the array substrate having a second light shield layer provided in an end of the array substrate,
    the second light shield layer is provided corresponding to the first light shield layer.

4. The device according to claim 3,
    wherein an end of the liquid crystal layer side of the second light shield layer is provided in same position as the end of the liquid crystal layer side of the first light shield layer.

5. The device according to claim 3,
    wherein an end of the other side of the second light shield layer is provided in same position as an end of the array substrate.

6. The device according to claim 1, wherein
    the liquid crystal display panel includes:
    a peripheral region placed adjacent to the display region; and
    a frame region placed adjacent to the peripheral region, and
    the liquid crystal display panel further includes:
    a driving circuit provided in the frame region and configured to drive a plurality of pixels; and
    a connection wiring pattern provided in the peripheral region and connecting the pixels with the driving circuit.

7. The device according to claim 6,
    wherein the opening of the second member has a size corresponding to the display region.

8. The device according to claim 6,
    wherein the driving circuit configured to drive the pixels includes a scanning line driving circuit configured to drive the pixels.

9. The device according to claim 1,
    wherein the end of the display region side of the second member is closer to the liquid crystal layer than the end of the display region side of the first member.

* * * * *